United States Patent
Arellano et al.

(10) Patent No.: US 9,573,552 B2
(45) Date of Patent: Feb. 21, 2017

(54) DELAY ORIFICE OPENING

(71) Applicant: Toyota Motor Engineering & Manufacturing North America, Inc., Erlanger, KY (US)

(72) Inventors: Nora Arellano, Ann Arbor, MI (US); Jonathan San, Ann Arbor, MI (US); Jessica Riffe, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 13/921,281

(22) Filed: Jun. 19, 2013

(65) Prior Publication Data

US 2014/0375037 A1 Dec. 25, 2014

(51) Int. Cl.
*B60R 21/233* (2006.01)
*B60R 21/232* (2011.01)

(52) U.S. Cl.
CPC ............ *B60R 21/233* (2013.01); *B60R 21/232* (2013.01)

(58) Field of Classification Search
CPC .... B60R 21/233; B60R 21/232; B60R 21/231; B60R 2021/23332
USPC .......................... 280/742, 729, 730.2, 743.1
See application file for complete search history.

(56) References Cited

U.S. PATENT DOCUMENTS

| | | | |
|---|---|---|---|
| 6,042,144 A | 3/2000 | Murakami et al. | |
| 7,059,634 B2 | 6/2006 | Bossecker et al. | |
| 7,066,487 B2 | 6/2006 | Sullivan et al. | |
| 7,396,043 B2 | 7/2008 | Choi et al. | |
| 7,481,454 B2 | 1/2009 | Sunabashiri | |
| 7,651,130 B2 | 1/2010 | Bauberger | |
| 7,832,760 B2 | 11/2010 | Mitsuo et al. | |
| 8,006,999 B2* | 8/2011 | Suemitsu et al. | 280/730.2 |
| 8,141,899 B2* | 3/2012 | Arima et al. | 280/730.2 |
| 8,186,710 B2 | 5/2012 | Cheal et al. | |
| 8,360,467 B2* | 1/2013 | Sato et al. | 280/730.2 |
| 8,360,468 B2* | 1/2013 | Sato | B60R 21/232 280/730.2 |
| 8,720,941 B1* | 5/2014 | Svensson | 280/730.2 |
| 2007/0138778 A1 | 6/2007 | Takemura et al. | |
| 2008/0079243 A1* | 4/2008 | Kino et al. | 280/728.2 |
| 2009/0212540 A1* | 8/2009 | Kamiyama | 280/729 |
| 2009/0236829 A1* | 9/2009 | Tanaka | B60R 21/232 280/728.2 |
| 2010/0084841 A1* | 4/2010 | Suemitsu et al. | 280/730.2 |
| 2010/0225097 A1* | 9/2010 | Trovato | B60R 21/232 280/730.2 |

(Continued)

OTHER PUBLICATIONS

U.S. Appl. No. 13/921,820, filed Jun. 19, 2013, Arellano.
U.S. Appl. No. 13/904,288, filed May 29, 2013, Arellano.

*Primary Examiner* — Karen Beck
(74) *Attorney, Agent, or Firm* — Oblon, McClelland, Maier & Neustadt, L.L.P.

(57) ABSTRACT

An airbag apparatus for a vehicle including an airbag stored in a folded state in a portion of a vehicle body and an inflator that provides a gas for inflating the airbag. The airbag including a main chamber and a delay chamber. The main chamber operable to be inflated earlier than the delay chamber. The delay chamber including an opening through which the gas passes from the main chamber to the delay chamber; and the delay chamber further including a weakened portion having less strength than the opening.

10 Claims, 4 Drawing Sheets

(56) References Cited

U.S. PATENT DOCUMENTS

| | | | |
|---|---|---|---|
| 2012/0098240 A1* | 4/2012 | Kato | B60R 21/232 |
| | | | 280/730.2 |
| 2012/0248749 A1* | 10/2012 | Sato | B60R 21/232 |
| | | | 280/730.2 |
| 2012/0248751 A1* | 10/2012 | Kato | B60R 21/232 |
| | | | 280/730.2 |
| 2012/0256401 A1* | 10/2012 | Kato et al. | 280/730.2 |
| 2012/0256402 A1* | 10/2012 | Kato | B60R 21/213 |
| | | | 280/730.2 |
| 2012/0299275 A1* | 11/2012 | Saimura | B60R 21/2346 |
| | | | 280/729 |
| 2012/0313356 A1* | 12/2012 | Saimura | B60R 21/233 |
| | | | 280/730.2 |
| 2012/0319383 A1* | 12/2012 | Sugiyama | B60R 21/213 |
| | | | 280/728.2 |
| 2013/0341894 A1* | 12/2013 | Nakashima et al. | 280/730.2 |
| 2015/0151708 A1* | 6/2015 | Kawamura | B60R 21/232 |
| | | | 280/728.2 |

* cited by examiner

DELAY ORIFICE OPENING

BACKGROUND

Field of the Disclosure

The invention generally relates to an airbag apparatus. More particularly, this invention relates to a curtain airbag apparatus for a vehicle.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A standard airbag apparatus is equipped to protect the driver and a front seat passenger of a vehicle during an accident. The airbag is inflated in response to receiving a signal from an electronic control unit reflecting that the vehicle has been in a collision. In many cases, the airbag can successfully save the driver and another passenger from injury or death.

In a related art, an airbag (e.g., a curtain airbag) can include a main chamber and a delay chamber connected by an opening. The gas provided by the inflator travels from the main chamber to the delay chamber via the opening connecting the main chamber to the delay chamber.

SUMMARY

The inventor discovered that, when an airbag having a main chamber and a delay chamber is inflated, there is a possibility of reducing the the size of the cross section of the opening. To avoid that problem, among others, the present invention provides an airbag apparatus, for example a curtain airbag apparatus, having an airbag including a main chamber and a delay chamber connected by an opening. This airbag apparatus also including a weakened portion having less strength than the opening.

An airbag apparatus according to one aspect of the invention includes an inflator that provides a gas for inflating the airbag, a main chamber, a delay chamber and an opening through which the gas passes from the main chamber to the delay chamber. The delay chamber also includes a weakened portion having less strength than the opening. The main chamber and delay chamber are divided by a seam line except for at a portion of the airbag where the opening is provided.

In the airbag apparatus according to the above aspect of the invention, upon the occurrence of a side impact of the vehicle or a rollover, the gas provided by the inflator passes through the main chamber first, and then the gas passes into the delay chamber. The gas passes through the opening which is provided between the main chamber and the delay chamber. Under this situation, there is a possibility of collapsing the opening, if the airbag does not include the weakened portion as described herein. The size or volume of the opening is relatively small compared with the volume of both the main chamber and the delay chamber. Because of the pressure of the gas passing through the chambers or deformation of the main chamber or delay chamber, the opening may collapse. Therefore, according to an aspect of the present invention, the weakened portion has less strength than the opening. Due to the weakened portion, before the opening is collapsed, the weakened portion collapses.

The structure of the opening and the weakened portion prevent the opening from collapsing before the delay chamber is fully inflated. In case the opening substantially maintains its size, the gas can pass from the main chamber to the delay chamber without time delay to open both the main chamber and the delay chamber. That is, while the delay chamber is inflating, the gas can pass through the main chamber and the opening without collapsing the opening.

In an airbag apparatus according to another aspect of the invention, the weakened portion is a recess provided in the airbag and configured to be collapsible such that the opening is maintained when the delay chamber is inflating. The recess is provided by changing the shape of the airbag. The recess created by the changed shape of the airbag is easier to collapse than the opening.

An airbag apparatus according to another aspect of the invention includes a substantially triangular or wedge shaped recess. A triangular shaped recess collapses naturally. This triangular shape is not necessarily an equilateral triangle. It is sufficient that the recess is approximately in the shape of a triangle such that an angle formed by the two walls of the recess portion is reduced during inflation.

In an airbag apparatus according to another aspect of the invention, the weakened portion is located where a vertical cross section of the delay chamber is largest.

Typically, a delay chamber of a curtain airbag does not have a uniform cross section. That is, when inflated the vertical length of a cross section of the delay chamber is longer than the vertical length of another cross section. The longer cross section portion is relatively stronger than the shorter cross section portion. Therefore, even if the weakened portion is located where a vertical cross section of the delay chamber is largest, the addition of the weakened portion does not affect the effectiveness of the airbag as a whole. Further, when the delay chamber is inflated, the delay chamber expands in a horizontal direction. The largest vertical cross section portion of the delay chamber requires the largest horizontal expansion if the weakened portion is not provided. Because, according to an embodiment of the present invention, the airbag apparatus is provided with the weakened portion, the delay chamber does not expand in the same manner as it would compared with the case where the airbag does not include the weakened portion. That is, when including the weakened portion, the pressure which would create a deformation of the delay chamber is reduced. As a result, locating the weakened portion at the largest vertical cross section of the delay chamber prevents a collapse of the opening.

In an airbag apparatus according to another aspect of the invention, the weakened portion is located on the downstream side of the delay chamber. The airbag can be considered to be divided into an upstream side and a downstream side in accordance with the gas flow. The weakened portion is more effective in preventing collapse of the opening if provided in the downstream side of the delay chamber rather than the upstream side of the delay chamber. In case the weakened portion is located in the upstream portion, the gas flow is restricted by the weakened portion. As a result, it may take a relatively longer time to inflate the delay chamber.

In an airbag apparatus according to another aspect of the invention, the airbag is a curtain airbag. However, the use of a weakened portion in other types of airbag apparatuses may be beneficial.

In an airbag apparatus according to another aspect of the invention, the curtain airbag is inflatable downwardly from an upper side edge portion by a gas provided by an inflator.

The folded curtain airbag is stored in the upper side edge portion of the vehicle. Therefore, the curtain airbag is inflated by the gas from the upper side edge portion to protect the driver and, if present, another passenger.

In an airbag apparatus according to another aspect of the invention, the delay chamber further includes means for avoiding having the opening collapse before the delay chamber is fully inflated.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
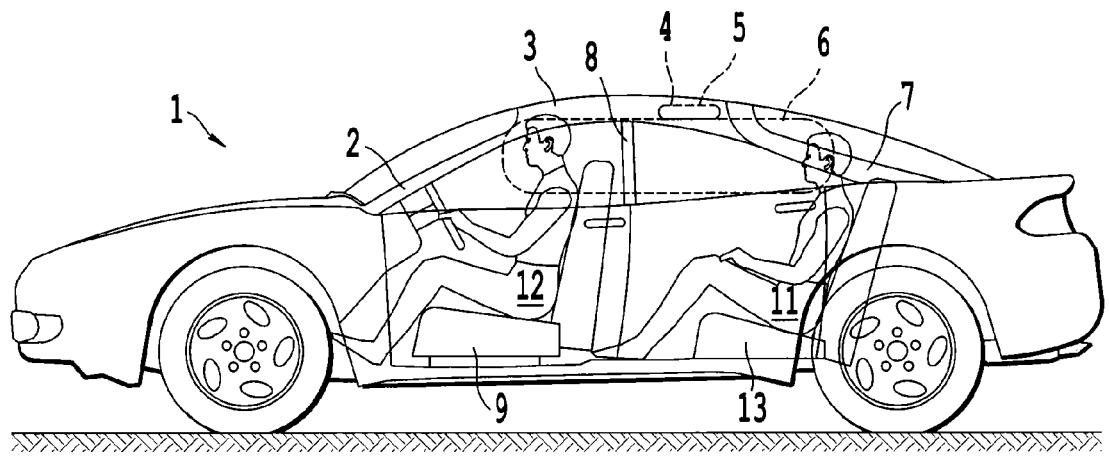
FIG. 1 is a cross section (side) view of the vehicle wherein the curtain airbag apparatus is mounted according to one embodiment of the invention.

Referring now to the drawings, wherein like reference numerals designate identical or corresponding parts throughout the several views.

An airbag apparatus according to one embodiment of the invention will be described with reference to FIG. 1 and FIG. 2. FIG. 1 is a side cross-sectional view of the vehicle 1 showing a curtain airbag 6. As shown in FIG. 1, the curtain airbag apparatus includes the airbag 6. The curtain airbag 6 is formed so as to be inflated like a curtain to protect vehicle occupants along the interior sides of the vehicle including side windshields and a center pillar, the so called B pillar 8. In this embodiment, the curtain airbag 6 is configured to cover the front and a part of rear side windshields located on one side of a front seat 9 and a rear seat 13. Because of this structure, the airbag can guard both a driver 12 and another passenger 11 from the side impact or the rollover of the vehicle. Of course, even if the airbag is designed only to protect the driver 12, the described embodiments can accomplish that object. In this case, the vehicle can provide another airbag for the additional passenger 11. The curtain airbag illustrated in FIG. 1 is for a B-Cab vehicle. However, the present invention is not limited to B-Cab type vehicles.

Although not illustrated in the drawings, the curtain airbag 6 can be folded into a cylindrical shape, among other shapes, and then stored along an upper side edge portion of the vehicle 1. The upper side edge includes a front pillar, the so called A pillar 2, and a roof side portion, the so called roof side rail 3. To guard both the driver and the rear passenger, the upper side edge also includes a rear pillar, the so called C pillar 7. As will be described later, the curtain airbag 6 can be inflated along the front and/or rear side windshields, as shown in FIG. 1, so as to protect the heads of occupants 11, 12 seated in the front seat 9 and rear seat 13. In this case there is no B-Pillar.

The curtain airbag 6 includes an inflator 5 for providing the gas into the curtain airbag 6. The inflator 5 is operated to generate the gas, and provide the gas into the curtain airbag 6. The gas port 4 of the inflator 5 communicates with an interior of the curtain airbag 6. In this embodiment, the inflator 5 is stored in the roof side portion. The shape of the curtain airbag 6 and the location of the inflator 5 will be described later.

Figure 2:
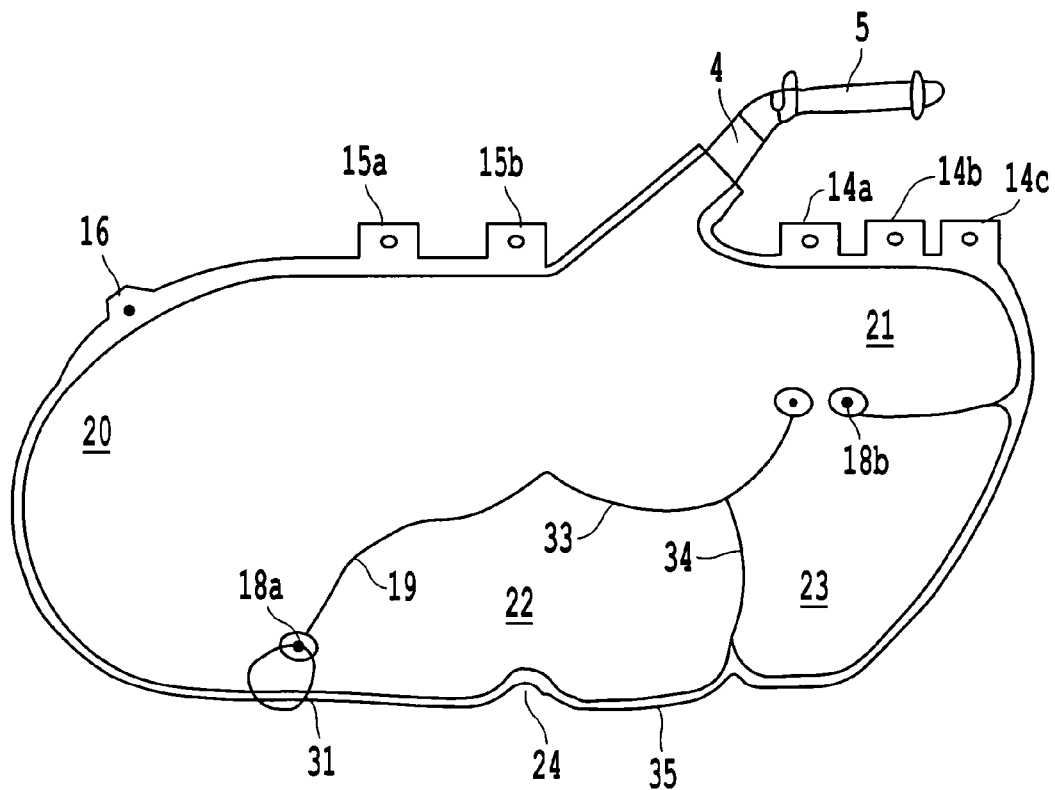
FIG. 2 is an enlarged side view showing an expanded view of a part of a curtain airbag apparatus that constitutes the curtain airbag apparatus of the first embodiment of FIG. 1.

The curtain airbag 6 and the inflator 5 are described in FIG. 2. The curtain airbag 5 illustrated in FIG. 2 has a flat shape. The curtain airbag includes a first main chamber 20, a second main chamber 21, a first delay chamber 22 and a second delay chamber 23. The first main chamber 20, the second main chamber 21, the first delay chamber 22, and the second delay chamber 23 are separated by a seam line 19 among other seam lines described below. The airbag is initially manufactured as a single chamber, and then the various chambers are created by providing the seams. When fully inflated, the main chambers of the curtain airbag 5 will have a warped shape. As used herein, the term "fully inflated" means that a chamber of the airbag has reached a sufficient fill level to protect occupants during a collision by a target timing. The fill requirement is different for a side impact versus a rollover. For a side impact, the main chambers are fully inflated and the delay chambers are filling. To satisfy the roll over requirement, both the main and delay chambers must be fully inflated.

An end of seam line (e.g., seam line 19) can be terminated using a stiffened member (e.g., stiffened members 18a and 18b). The first main chamber 20 is typically the largest chamber of the airbag. Consequently, when the first main chamber 20 is fully inflated, the horizontal cross section of the first main chamber 20 is the widest. To prevent such a wide expansion, the first main chamber 20 can include an un-inflated portion and the stiffened member 18a.

The airbag 6 is designed to be stored in the roof side portion of the vehicle. The upper side of the airbag is attached to the roof side portion by fixtures 14a, 14b, 14c, 15a, 15b, and 16. Although the airbag is inflatable downwardly from the upper side portion, the airbag is designed to substantially cover the side windshields due in part to the fixtures.

The vehicle equipped with the airbag apparatus also has an ECU for controlling the deployment of the airbag. The ECU is not illustrated in FIGS. 1 and 2. However, typically the ECU is electrically connected to a side impact sensor and a rollover sensor. The side impact sensor is configured to predict or detect a side impact of the vehicle, and generate a side-impact detection signal to the ECU. The rollover sensor is configured to predict or detect rollover of the vehicle, and generate a rollover detection signal communicated to the ECU.

The ECU is electrically connected to the inflator 5. The ECU is configured to operate the inflator when the ECU receives a side impact signal or when the ECU receives a rollover signal. Thus, when a side impact or rollover occurs, the airbag is inflated with the gas provided by the inflator.

As shown in FIG. 2, the airbag 6 includes the gas port 4, the first main chamber 20 and the second main chamber 21 as a first deployment portion, and the first delay chamber 22 and the second delay chamber 23 as the second deployment portion. The first main chamber 20 can communicate to the first delay chamber 22 via an opening 31. The first main chamber 20 is typically designed to fully inflate prior to the first delay chamber. The opening 31 is a gas passageway between the first main chamber 20 and the first delay chamber 22 structurally defined by the stiffened member 18a and the adjacent periphery of the airbag 6.

The gas port 4 may have a cylindrical shape and extends from the inflator 5. The gas port 4 is connected to the first main chamber 20, enabling the first main chamber to be inflated at first.

The first main chamber 20 is provided to mainly protect the head of an occupant. The delay chamber 22 also is provided to protect the head of the occupant and the body of the occupant. The seat 9 includes a seat airbag. The seat airbag is not illustrated in FIG. 1 or 2. However, the seat airbag is designed to be stored in the back of the seat 9. The same as described above with regard to the curtain airbag 6, when the ECU receives a side impact signal or when the ECU receives a rollover signal, the seat airbag will be inflated. To avoid interference between the seat airbag and the curtain airbag 6, the curtain airbag 6 includes the delay chamber 22 in accordance with the location of the fully inflated seat airbag.

As shown in FIG. 2, the first embodiment has a recess 24. The recess 24 constitutes a means for avoiding having the opening collapse before the delay chamber is fully inflated. The recess 24 is provided in the delay chamber 22. More particularly, the recess 24 is located on the bottom periphery of the delay chamber 22. The shape of the recess 24 can be a substantially triangular notch. As described later, a substantially triangular notch is conducive to having the two opposing walls collapse inwardly. The shape of the recess is not limited to a substantially triangular shape.

Figure 5:
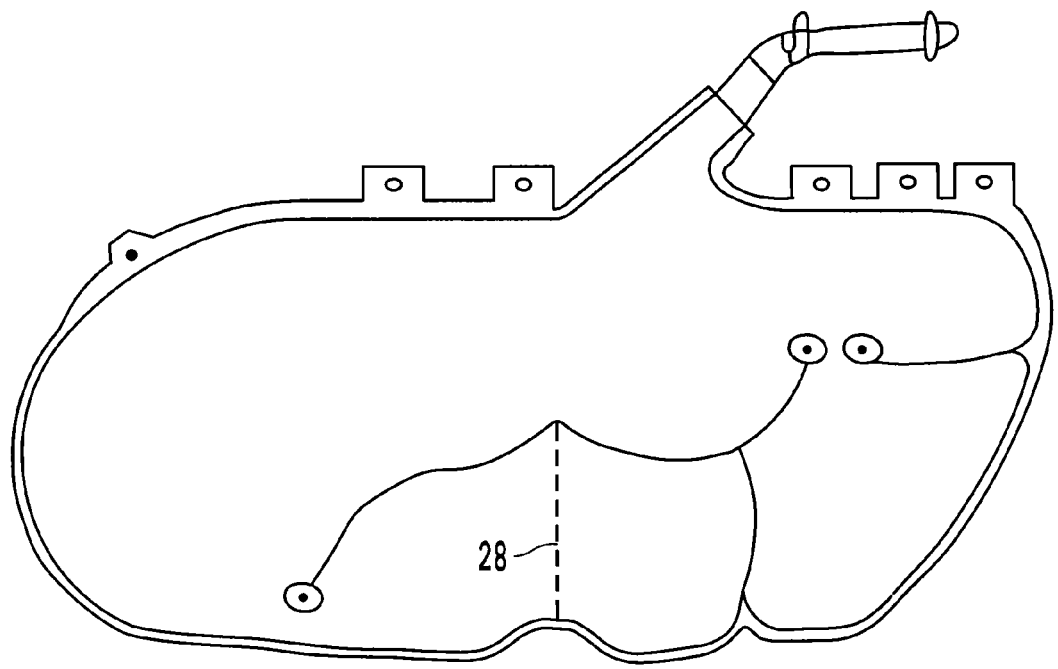
FIG. 5 is also an enlarged side view showing a part of a curtain airbag apparatus to further describe the first to fifth embodiments of FIG. 1.

The cross-sectional vertical length of the delay chamber varies. As shown in FIG. 2, the vertical length near the opening 31 is shorter than the vertical length at other locations. More particularly, the delay chamber 22 volume is defined by the seam 19, seam 33, seam 34, and the peripheral section 35 of the airbag. The vertical length from the peripheral section 35 of the airbag to the intersection of seam 32 and seam 33 is the longest length. That length is illustrated in FIG. 5 by the phantom line 28.

The structural strength or stiffness of the delay chamber 22 is a function of the vertical length of the cross section. The longer the vertical cross section length, the stiffer the corresponding portion of the delay chamber will be when fully inflated. Thus, the opening 31 has the shortest vertical cross-sectional length and is susceptible to collapsing during the inflation process. If the airbag has a recess as described herein, the recess becomes the weakest portion in lieu of the opening 31. To compensate for the intended structural weakness of the opening 31, according to an aspect of the invention, the recess 24 can be provided at the location of the vertical cross section of the first delay chamber which is longest.

Figure 6:
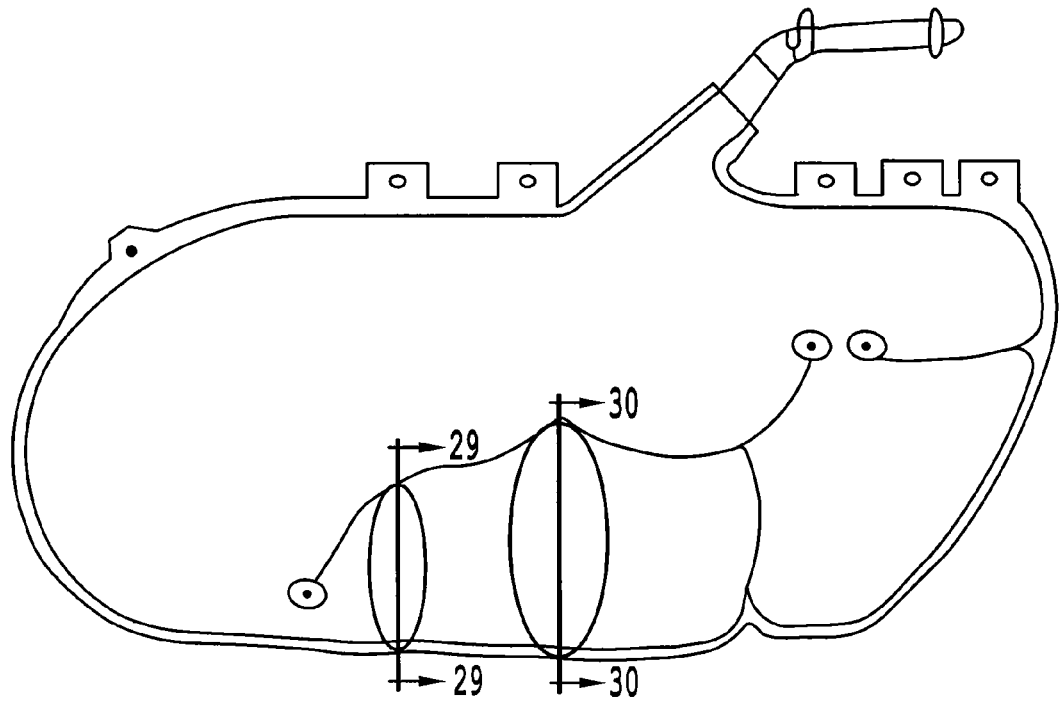
FIG. 6 is also an enlarged side view showing a part of a curtain airbag apparatus to further describe the first to fifth embodiments of FIG. 1.

There is another advantage for locating the recess 24 where the vertical cross section of the first delay chamber 22 is longest. As shown in FIG. 6, a cross section 30 of the inflated airbag is wider than a cross section 29. In case the first delay chamber 22 expands horizontally, the opening will readily collapse because of the deformation of the first delay chamber 22. Locating the recess where a vertical cross section of the delay chamber 22 is longest can prevent deformation of the first delay chamber 22 horizontally. Because of the existence of the recess 24, the vertical length from the top of the recess to the top portion of the delay chamber is shortened.

Figure 3:
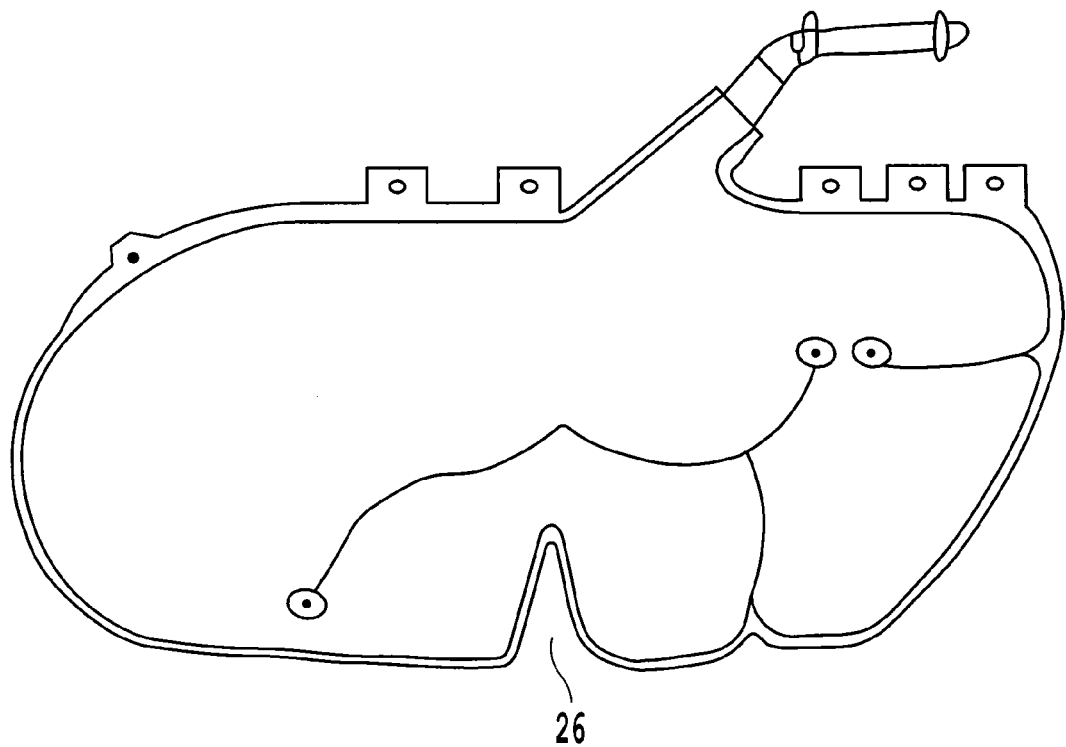
FIG. 3 is also an enlarged side view showing a part of a curtain airbag apparatus that constitutes the curtain airbag apparatus of the second embodiment of FIG. 1.
Figure 4:
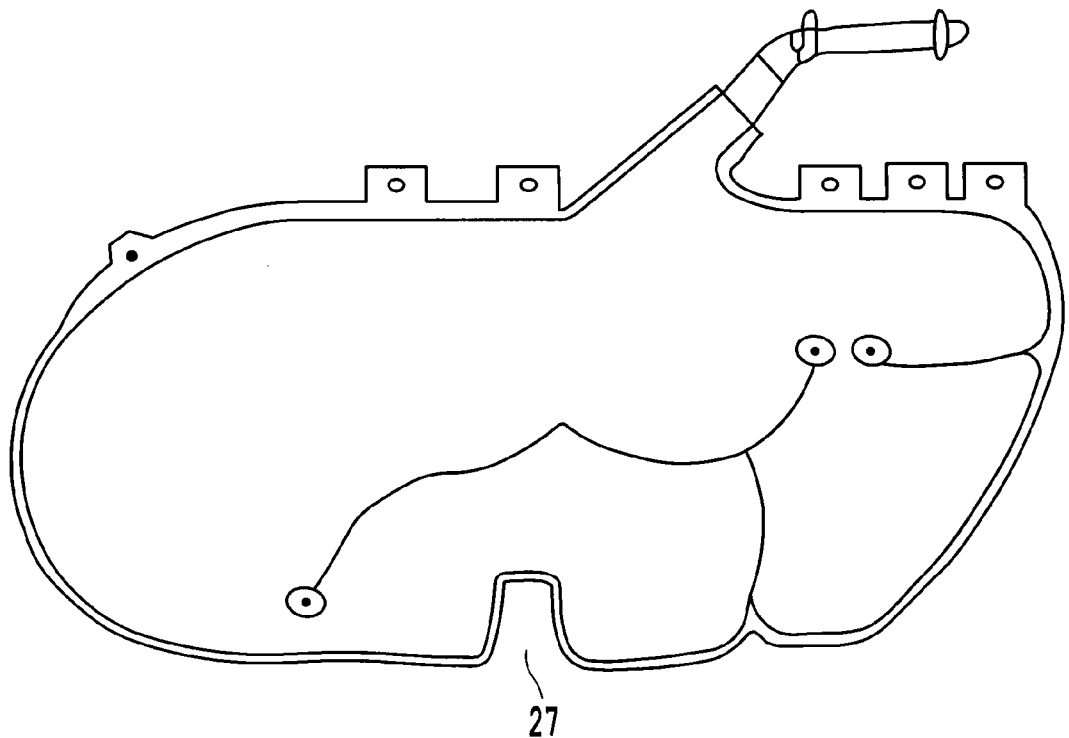
FIG. 4 is also an enlarged side view showing a part of a curtain airbag apparatus that constitutes the curtain airbag apparatus of the third embodiment of FIG. 1.

Alternative shapes of the recess are possible. For example, FIG. 3 illustrates an elongated triangular notch 26. The maximum height of the elongated triangular notch should be decided based on the purpose or aim of the recess. It is sufficient for the elongated triangular notch to have less strength than the opening to avoid having the opening collapse before the first delay chamber 22 is fully inflated. Also, as shown in FIG. 4, a rectangular shaped recess 27 can also be used. Both of these embodiments of the recess constitute means for avoiding having the opening collapse before the delay chamber is fully inflated.

As discussed above, the first delay chamber 22 can be described in terms of the upstream side and the downstream side. The recess 24 can be located at the down streamside relative to the intersection of seam 19 and 33. Even if the recess is located downstream of the intersection, the location of the recess is acceptable so long as the recess remains structurally weaker than the opening 31 to avoid having the opening 31 collapse before the first delay chamber is fully inflated and to maintain a balance between the intended strengths and the weaknesses of the airbag as a whole.

Figure 7:
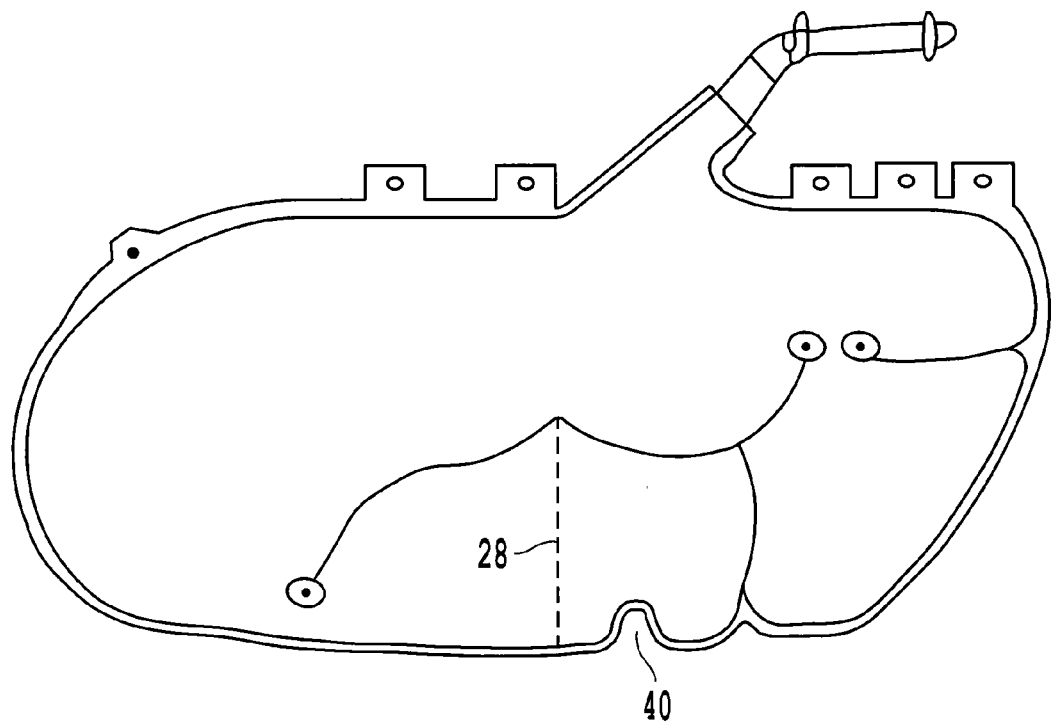
FIG. 7 is also an enlarged side view showing a part of curtain airbag apparatus that constitutes the curtain airbag apparatus of the forth embodiment of FIG. 1.

As discussed above, the first delay chamber can be described in terms of the upstream side and the downstream side. The recess 24 can be located in the down streamside, as shown in FIG. 7, according to a fourth embodiment. It is acceptable to locate the recess 24 at a position other than where the vertical cross section of the delay is the largest so long as the recess 24 has less strength than the opening 31 to avoid having the opening 31 collapse.

Figure 8:
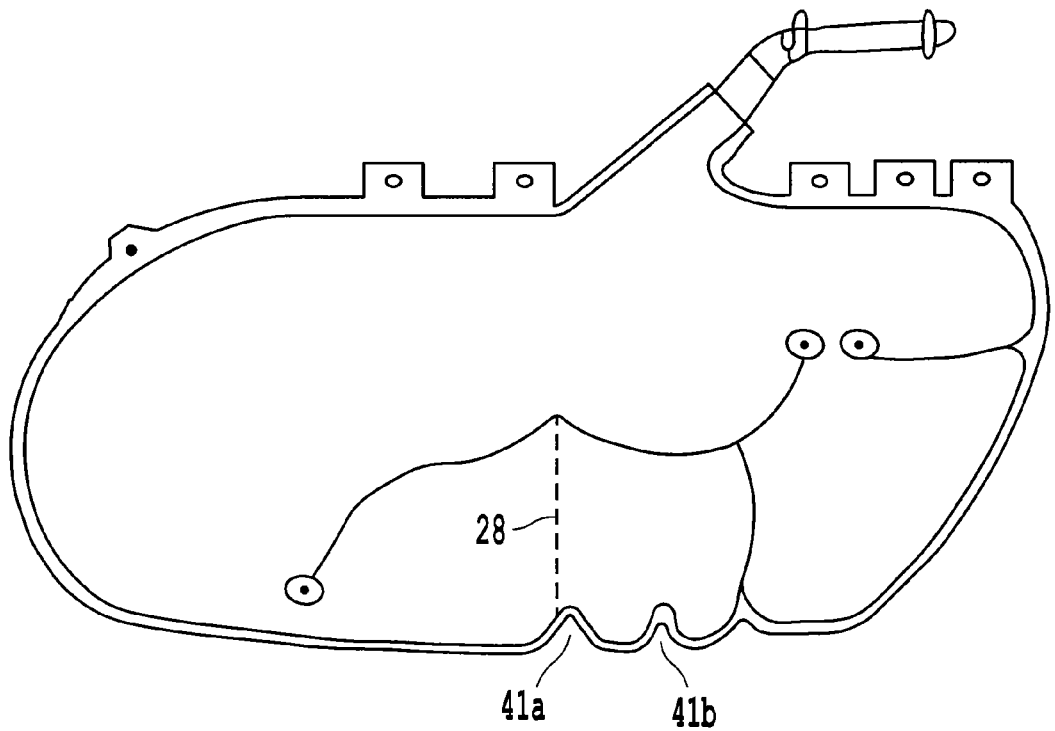
FIG. 8 is also an enlarged side view showing a part of curtain airbag apparatus that constitutes the curtain airbag apparatus of the fifth embodiment of FIG. 1.

As shown in FIG. 8, a plurality of recesses can be provided in the airbag according to a fifth embodiment. In this exemplary embodiment, there are two recesses. The first recess 41a is located downstream from the phantom line where the cross section of the delay is the largest. The second recess 41b is also located downstream from the first recess 41a. The recesses can also be located upstream. Although, in this embodiment the airbag has two recesses, the number of recesses is not so limited so long as the plurality of recesses collectively have less strength than the opening to avoid having the opening 31 collapse. The plurality of recesses also constitute a means for avoiding having the opening collapse before the delay chamber is fully inflated.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. An airbag apparatus for a vehicle, comprising:
   an airbag stored in a folded state in a portion of a vehicle body;
   an inflator that provides a gas for inflating the airbag;
   the airbag including a main chamber, a first delay chamber, and a second delay chamber;
   the main chamber operable to be inflated earlier than the first delay chamber;
   the first delay chamber including a first opening through which the gas passes from the main chamber to the first delay chamber, the second delay chamber including a second opening through which the gas passes from the main chamber directly to the second delay chamber, the main chamber and the first delay chamber are divided by a first seam line except for at a portion of the airbag where the first opening is provided, and the first delay chamber and the second delay chamber are divided by a second seam line; and
   the first delay chamber further including a recess located a predetermined distance downstream from the first opening and having a shape configured to collapse,
   wherein the first delay chamber fully inflates prior to the first opening collapsing due to inflation, and a shape of the recess is approximately a triangle.

2. The airbag apparatus for the vehicle according to claim 1,
   wherein the recess is located where a cross section of the first delay chamber is largest.

3. The airbag apparatus for the vehicle according to claim 1,
   wherein the gas provided by the inflator travels from an upstream side to a downstream side of the first delay chamber, and the recess is located on the downstream side of the first delay chamber relative to where a cross section of the first delay chamber is largest.

4. The airbag apparatus for the vehicle according to claim 1,
   the airbag is a curtain airbag.

5. The airbag apparatus for the vehicle according to claim 4,
   wherein the curtain airbag is inflatable downwardly from an upper side edge portion by the gas provided by the inflator.

6. An airbag apparatus for a vehicle, comprising:
   an airbag stored in a folded state in a portion of a vehicle body;
   an inflator that provides a gas for inflating the airbag;
   the airbag including a main chamber, a first delay chamber, and a second delay chamber;
   the main chamber operable to be inflated earlier than the first delay chamber;
   the first delay chamber including a first opening through which the gas passes from the main chamber to the first delay chamber, the second delay chamber including a second opening through which the gas passes from the main chamber directly to the second delay chamber, the main chamber and the first delay chamber are divided by a first seam line except for at a portion of the airbag where the first opening is provided, and the first delay chamber and the second delay chamber are divided by a second seam line; and
   the first delay chamber further including means for avoiding having the first opening collapse before the first delay chamber is fully inflated, the means for avoiding the first opening collapse located a predetermined distance downstream from the first opening, wherein the first delay chamber fully inflates prior to the opening collapsing due to inflation.

7. The airbag apparatus for the vehicle according to claim 6,
   wherein the means for avoiding having the opening collapse is located where a cross section of the first delay chamber is largest.

8. The airbag apparatus for the vehicle according to claim 6,
   wherein the gas provided by the inflator travels from an upstream side to a downstream side of the first delay chamber, and the means for avoiding having the opening collapse is located on the downstream side of the first delay chamber relative to where the cross section of the first delay chamber is largest.

9. The airbag apparatus for the vehicle according to claim 6,
   wherein the airbag is a curtain airbag.

10. The airbag apparatus for the vehicle according to claim 6,
    wherein the curtain airbag is inflatable downwardly from an upper side edge portion by the gas provided by the inflator.

* * * * *